US012665372B2

(12) United States Patent
Nakashima

(10) Patent No.: US 12,665,372 B2
(45) Date of Patent: Jun. 23, 2026

(54) LASER PROCESSING APPARATUS

(71) Applicant: BROTHER KOGYO KABUSHIKI KAISHA, Nagoya (JP)

(72) Inventor: Kazuhiro Nakashima, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 986 days.

(21) Appl. No.: 17/702,931

(22) Filed: Mar. 24, 2022

(65) Prior Publication Data

US 2022/0216663 A1     Jul. 7, 2022

Related U.S. Application Data

(63) Continuation of application No. PCT/JP2020/004510, filed on Feb. 6, 2020.

(30) Foreign Application Priority Data

Sep. 26, 2019    (JP) ................................. 2019-175213

(51) Int. Cl.
*H01S 3/04* (2006.01)
*B23K 26/70* (2014.01)

(52) U.S. Cl.
CPC .......... *H01S 3/0404* (2013.01); *B23K 26/703* (2015.10)

(58) Field of Classification Search
CPC .............. H01S 3/0404; H01S 5/02407; H01S 3/04–042; B23K 26/703; B23K 37/003
See application file for complete search history.

(56) References Cited

U.S. PATENT DOCUMENTS

| | | | | |
|---|---|---|---|---|
| 5,253,261 A | * | 10/1993 | Chaffee | ................. H01S 3/0326 372/37 |
| 5,650,078 A | * | 7/1997 | Hamura | ............. B23K 26/1435 219/130.01 |
| 5,748,656 A | | 5/1998 | Watson et al. | |
| 5,790,575 A | * | 8/1998 | Zamel | ................... H01S 3/0941 372/98 |
| 6,307,871 B1 | * | 10/2001 | Heberle | ................. H01S 3/042 372/36 |

(Continued)

FOREIGN PATENT DOCUMENTS

| | | | | | |
|---|---|---|---|---|---|
| CN | 112448253 | A | * | 3/2021 | |
| CN | 113300194 | A | * | 8/2021 | ........... H01S 3/0407 |

(Continued)

OTHER PUBLICATIONS

Extended European Search Report dated Sep. 27, 2023 from related EP 20 86 7168.5.

(Continued)

*Primary Examiner* — Joshua King
(74) *Attorney, Agent, or Firm* — Scully, Scott, Murphy & Presser, PC

(57)           ABSTRACT

A laser processing apparatus includes: a laser emission unit configured to emit laser beam; a control member configured to control the laser emission unit; a casing in which the laser emission unit and the control member are accommodated; and a pipe through which compressed gas supplied from outside of the casing flows in a branched manner, the pipe being provided in the casing. The pipe includes a first branch pipe arranged with a leading end for jetting the compressed gas facing the laser emission unit, and a second branch pipe arranged with a leading end for jetting the compressed gas facing the control member.

10 Claims, 12 Drawing Sheets

(56) References Cited

U.S. PATENT DOCUMENTS

| 6,813,289 | B2 * | 11/2004 | Gruzdev | ................. | H01S 3/042 |
| | | | | | 372/34 |
| 7,715,454 | B2 * | 5/2010 | Sukhman | ................ | H01S 3/041 |
| | | | | | 372/34 |
| 9,987,185 | B1 * | 6/2018 | Crosby | .................... | A61N 5/00 |
| 2004/0183876 | A1 * | 9/2004 | Mizuno | ............... | B41J 2/16532 |
| | | | | | 347/92 |
| 2004/0221604 | A1 * | 11/2004 | Ota | .................... | H05K 7/20781 |
| | | | | | 361/691 |
| 2004/0234301 | A1 * | 11/2004 | Sato | .................. | G03G 15/0194 |
| | | | | | 399/302 |
| 2009/0194260 | A1 * | 8/2009 | Liao | .................... | H01L 23/4006 |
| | | | | | 165/104.33 |
| 2015/0030043 | A1 * | 1/2015 | Bewer | .................. | H01S 3/2232 |
| | | | | | 372/35 |
| 2015/0333467 | A1 * | 11/2015 | Tanaka | ................. | H01S 3/0407 |
| | | | | | 372/6 |
| 2016/0236300 | A1 * | 8/2016 | Vogler | ...................... | H01S 3/02 |

FOREIGN PATENT DOCUMENTS

| CN | 113690720 | A | * | 11/2021 | | |
| JP | S63172481 | A | * | 7/1988 | | |
| JP | H1022549 | A | | 1/1998 | | |
| JP | H10125981 | A | | 5/1998 | | |
| JP | H11509373 | A | | 8/1999 | | |
| JP | 2016072338 | A | | 5/2016 | | |
| JP | 2016081993 | A | | 5/2016 | | |
| JP | 6156311 | B2 | * | 7/2017 | | |
| KR | 101821927 | B1 | | 1/2018 | | |
| TW | 200814477 | A | * | 3/2008 | ............ | H01S 3/223 |
| WO | 1997015101 | A1 | | 4/1997 | | |

OTHER PUBLICATIONS

International Search Report dated Apr. 14, 2020 issued in PCT/JP2020/004510.
International Preliminary Report on Patentability and Written Opinion dated Apr. 7, 2022 issued in PCT/JP2020/004510.

* cited by examiner

LASER PROCESSING APPARATUS

CROSS-REFERENCE TO RELATED APPLICATIONS

This application is a Continuation Application of International Application No. PCT/JP2020/004510 claiming the conventional priority of Japanese patent Application No. 2019-175213 filed on Sep. 26, 2019. The disclosures of Japanese patent Application No. 2019-175213 and International Application No. PCT/JP2020/004510 are incorporated herein by reference in their entirety.

BACKGROUND

The present disclosure relates to a laser processing apparatus applied to cooling a laser emission unit.

Conventionally, there are proposed various techniques related to the laser processing apparatus mentioned above. For example, there is known a laser optical apparatus where a laser beam source unit is provided on an entire gantry, and a casing encloses a laser beam source of the laser beam source unit. One end of each of an air intake duct and an air exhaust duct made of a flexible material is connected to the casing. The air intake duct is flexed appropriately with its other end being opened in a cover member while the other end of the air exhaust duct is connected to an air exhaust fan provided in the cover member. By virtue of this, an air flow for preventing the laser beam source from temperature increase is secured.

SUMMARY

However, in the above described technique, no consideration is made for a control member which controls the laser beam source unit, although the control member generates heat. Even though the control member is cooled by the air flow for preventing the laser beam source from temperature increase, this is no more than a secondary cooling such that the control member cannot be cooled sufficiently. Therefore, the temperature inside the casing increases due to the influence of the heat emitted from the control member, such that the laser beam source unit is liable to insufficient cooling.

Accordingly, the present disclosure is made in view of the above situation, and an object thereof is to provide a laser processing apparatus facilitating improvement of the cooling efficiency for the laser emission unit and the control member.

The present specification discloses a laser processing apparatus including:

a laser emission unit configured to emit laser beam;

a control member configured to control the laser emission unit;

a casing in which the laser emission unit and the control member are accommodated; and a pipe through which compressed gas supplied from outside of the casing flows in a branched manner, the pipe being provided in the casing, wherein the pipe includes a first branch pipe arranged with a leading end for jetting the compressed gas facing the laser emission unit, and a second branch pipe arranged with a leading end for jetting the compressed gas facing the control member.

According to the present disclosure, the laser processing apparatus is capable of facilitating improvement of the cooling efficiency for the laser emission unit and the control member.

BRIEF DESCRIPTION OF THE DRAWINGS

FIG. 3 is a perspective view showing the same laser marker without an outer cover.

FIG. 4 is a schematic view for explaining a piping system for compressed air in the same laser marker.

FIG. 6 is another view showing the enlarged part A of FIG. 3.

FIG. 11 is a perspective view showing the same laser marker with a silencer being disassembled.

DETAILED DESCRIPTION

Figure 1:
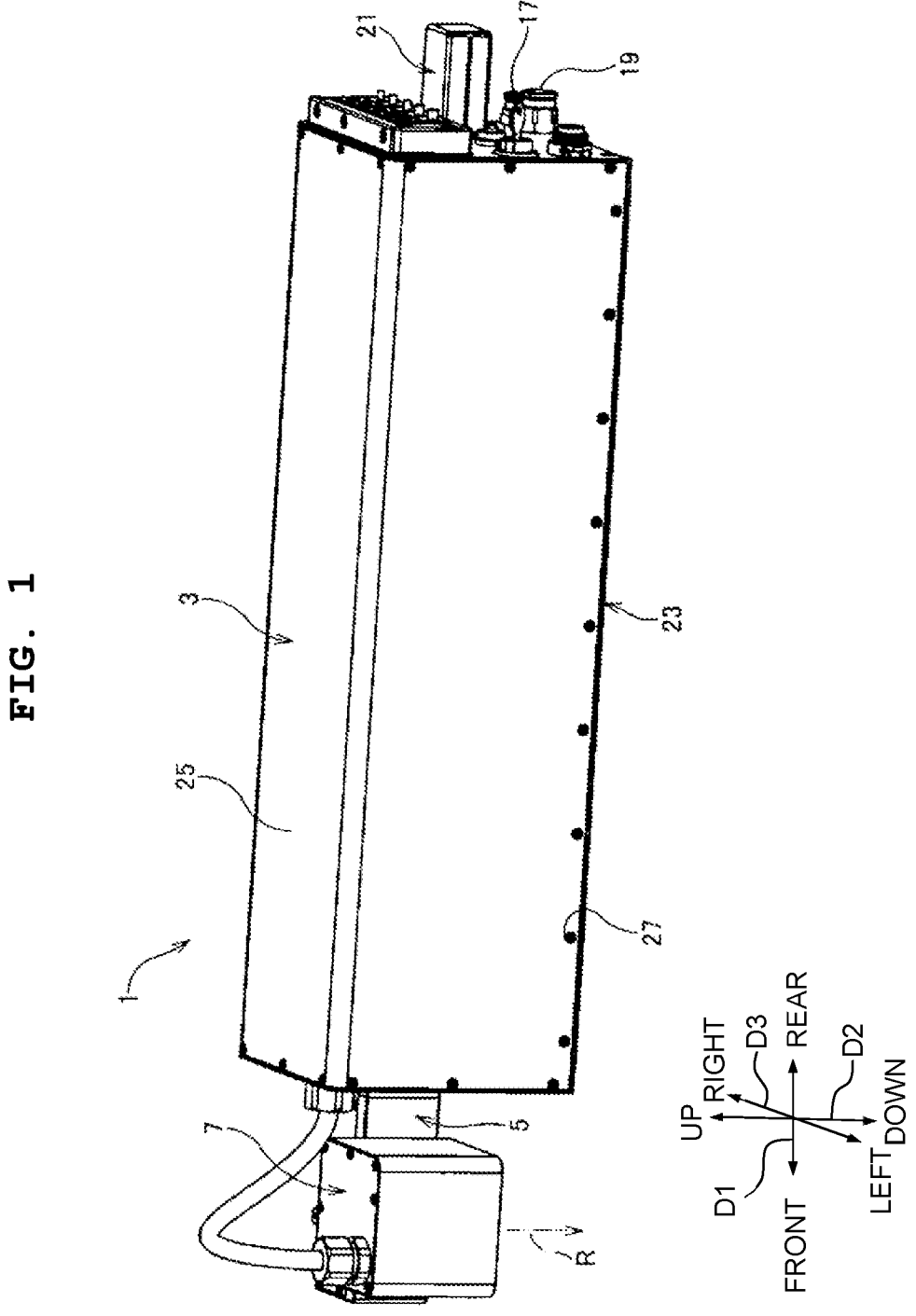
FIG. 1 is a perspective view showing a laser marker according to an embodiment of the present disclosure.

Hereinbelow, an explanation will be made on a laser marker of the present disclosure, based on an embodiment having made the same in a concrete manner, referring to the accompanied drawings. In the drawings used for the following explanation, part of the basic configuration may be omitted in illustration, and the ratio in size and the like may not be necessarily correct for each illustrated part. In the respective drawings, a front/rear direction D1, an up/down direction D2 and a left/right direction D3 are presented as indicated in each drawing.

Figure 2:
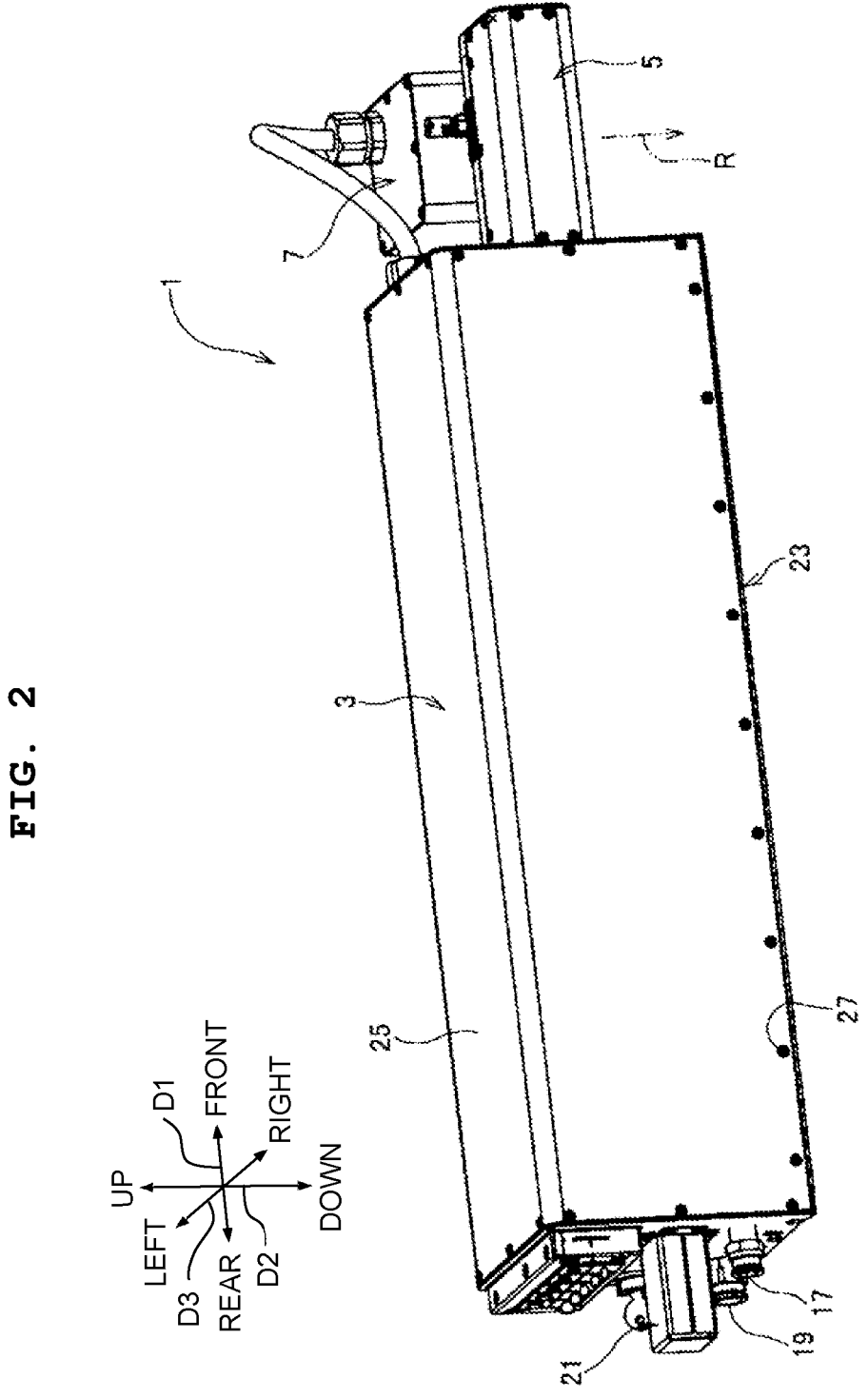
FIG. 2 is another perspective view showing the same laser marker.

As shown in FIGS. 1 and 2, a laser marker 1 of this embodiment is dust-proof and water-proof, including a first body 3, a second body 5, and a third body 7. From the third body 7, laser beam R is emitted for marking (printing) processing. The laser beam R is oscillated and emitted from a laser emission unit 9 provided inside the first body 3, reflected from a reflecting mirror 11 provided inside the second body 5, and finally scanned and collected by a galvanic scanner 13 and an fθ lens 15 provided inside the third body 7 (see FIGS. 9 and 10).

Inside the first body 3, air cooling is performed by way of taking in compressed air from an air intake port 17, and discharging the air from an exhaust port 19 or a silencer 21. Note that the air intake port 17 is connected with an unshown air compressor provided separate from the laser marker 1, via a pipe. The compressed air supplied from the air compressor is taken into the first body 3 from the air intake port 17. The air intake port 17 and the exhaust port 19 are pipe joints of one-touch type. The first body 3 is shaped into an approximate cuboid elongate in the front/rear direction D1, including a base member 23 and an outer cover 25. The base member 23 and the outer cover 25 are fixed with screws 27.

In the laser marker 1 of this embodiment, although many of its components (for example, the outer cover 25 and the like) are fixed with the screws in a removable manner, detailed explanation is omitted. Note that the screws for fixation are in a plurality of types.

Figure 3:
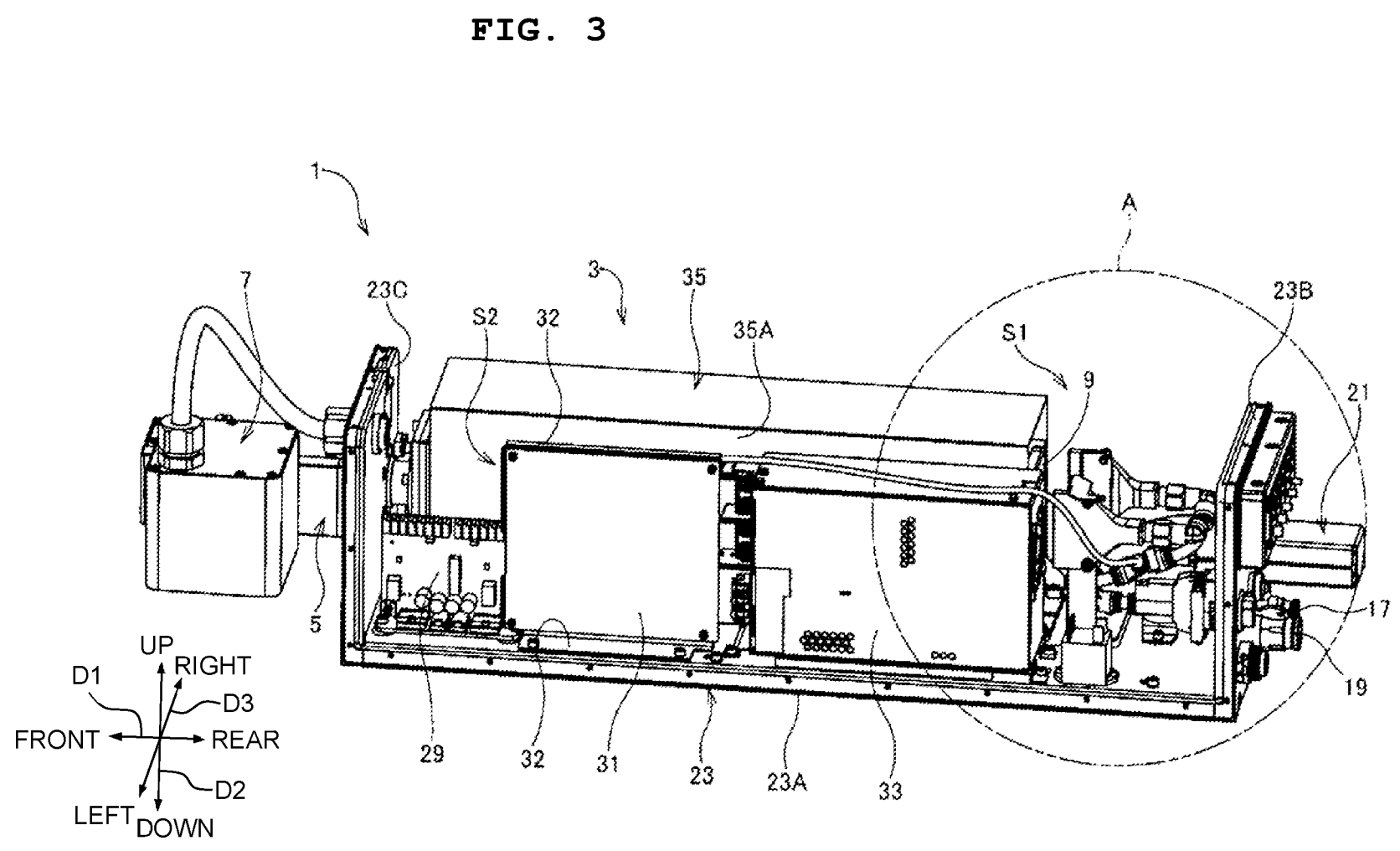

Hereinbelow, referring to the drawings and the like showing the first body 3 where the outer cover 25 is removed, the first body 3 will be explained. As shown in FIG. 3, the base member 23 includes a base plate 23A, a back plate 23B, and a front plate 23C. The back plate 23B is provided to stand up from the rear end of the base plate 23A. The back plate 23B is provided with the air intake port 17, the exhaust port 19, the silencer 21, and the like. The front plate 23C is provided to stand up from the front end of the base plate 23A. The front plate 23C is provided with the second body 5 (and the third body 7).

On the base plate 23A, the laser emission unit 9 is arranged along the front/rear direction D1 and, on the left side of the laser emission unit 9, a galvanic substrate 29, a main substrate 31, a power unit 33 and the like are arranged. The galvanic substrate 29 is a substrate for controlling the galvanic scanner 13. The main substrate 31 is a substrate for controlling the laser marker 1 and is fixed on the base plate 23A via a metallic bracket 32. The bracket 32 is bent into an approximate L shape as viewed from the front/rear direction D1, and fixed with the main substrate 31 on the left surface at the other side than the laser emission unit 9. The power unit 33 is provided to supply electric power to the laser marker 1.

The laser emission unit 9 is covered by an inner cover 35. The inner cover 35 is shaped into an approximate cuboid elongate in the front/rear direction D1, and its lower side, front side and rear side are all open. When the inner cover 35 is fixed on the base plate 23A along the front/rear direction D1, then a space is formed in the inner cover 35 to accommodate the laser emission unit 9 therein and let the front side and the rear side be open.

Inside the first body 3, a left surface 35A of the inner cover 35 partitions the space into a first space S1 and a second space S2. That is, inside the first body 3, the first space S1 is the right part from the left surface 35A of the inner cover 35 whereas the second space S2 is the left part from the left surface 35A of the inner cover 35. The laser emission unit 9 and the like are arranged in the first space S1. The galvanic substrate 29, the main substrate 31 (and the bracket 32), the power unit 33, and the like are arranged in the second space S2. By virtue of this, between the laser emission unit 9 and the main substrate 31 (and the bracket 32), the left surface 35A of the inner cover 35 is interposed.

The second space S2 is in communication with the first space S1 at both sides in the front/rear direction D1 in which the left surface 35A of the inner cover 35 extends. The back plate 23B, where the exhaust port 19 and the silencer 21 are provided, is arranged at the rear side among the two sides in the front/rear direction D1 where the first space S1 and the second space S2 are in communication. On the other hand, the front plate 23C is arranged at the front side among the two sides in the front/rear direction D1 where the first space S1 and the second space S2 are in communication.

Figure 4:
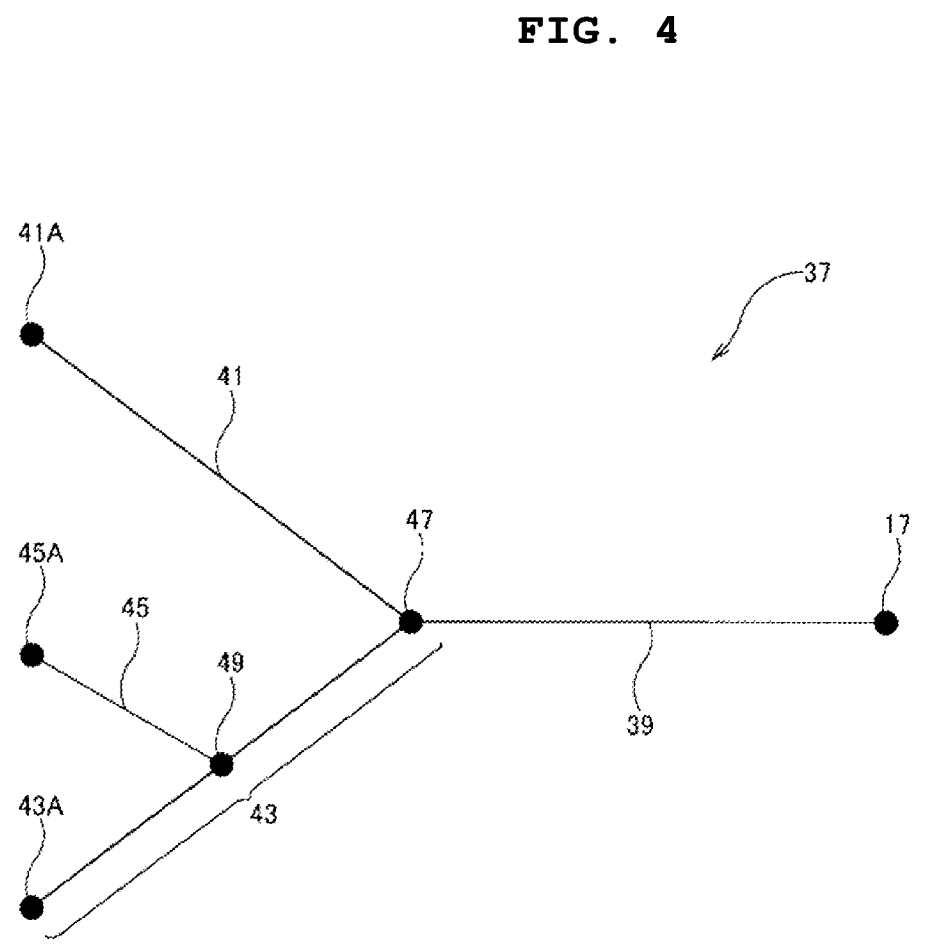

A pipe 37 shown in FIG. 4 is provided in the first body 3. The pipe 37 is adapted to schematically show a system where the compressed air flows. The compressed air is taken into the first body 3 from the air intake port 17. The system of the pipe 37 will be explained below. Note that a specific configuration of the pipe 37 will be described later. The pipe 37 is configured for the compressed air to flow therethrough and constructed from a main pipe 39, a first branch pipe 41, a second branch pipe 43, and a third branch pipe 45. One end of the main pipe 39 is connected to the air intake port 17. The other end of the main pipe 39 serves as a first branch point 47. The internal diameter of the main pipe 39 is, for example, 5 mm. The main pipe 39 is branched into the first branch pipe 41 and the second branch pipe 43 at the first branch point 47.

The internal diameter of the first branch pipe 41 is, for example, 5 mm. A second branch point 49 is provided midway in the second branch pipe 43. The second branch pipe 43 is branched into the third branch pipe 45 and another part of the second branch pipe 43 at the second branch point 49. The second branch pipe 43 has such an internal diameter of 5 mm, for example, as from the first branch point 47 to the second branch point 49, and such an internal diameter of 2.5 mm, for example, as from the second branch point 49 to a leading end 43A. The internal diameter of the third branch pipe 45 is, for example, 5 mm. A leading end 41A of the first branch pipe 41, the leading end 43A of the second branch pipe 43, and a leading end 45A of the third branch pipe 45 are open from which the compressed air taken from the air intake port 17 is jetted.

Figure 5:
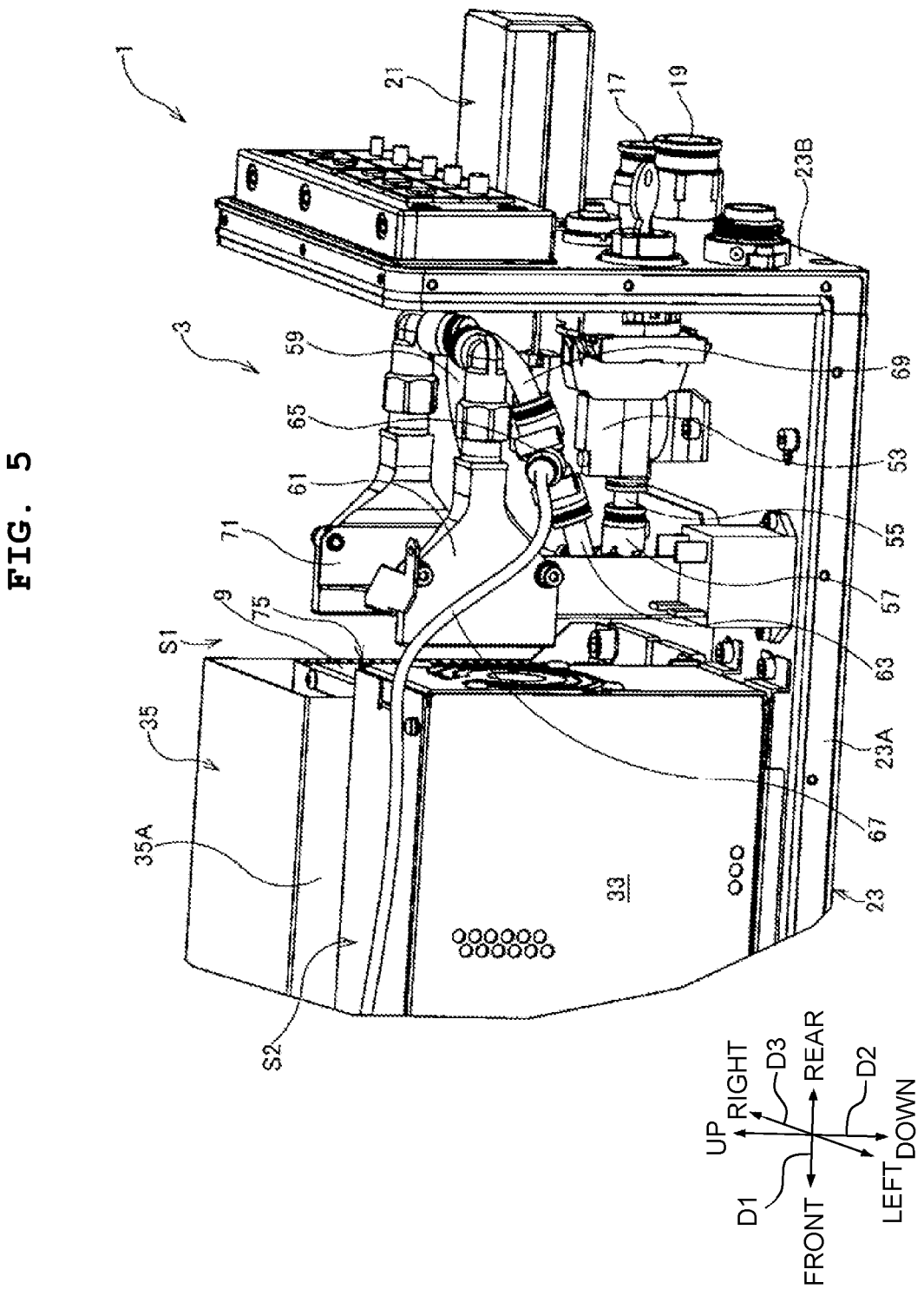
FIG. 5 is a view showing an enlarged part A of FIG. 3.
Figure 6:
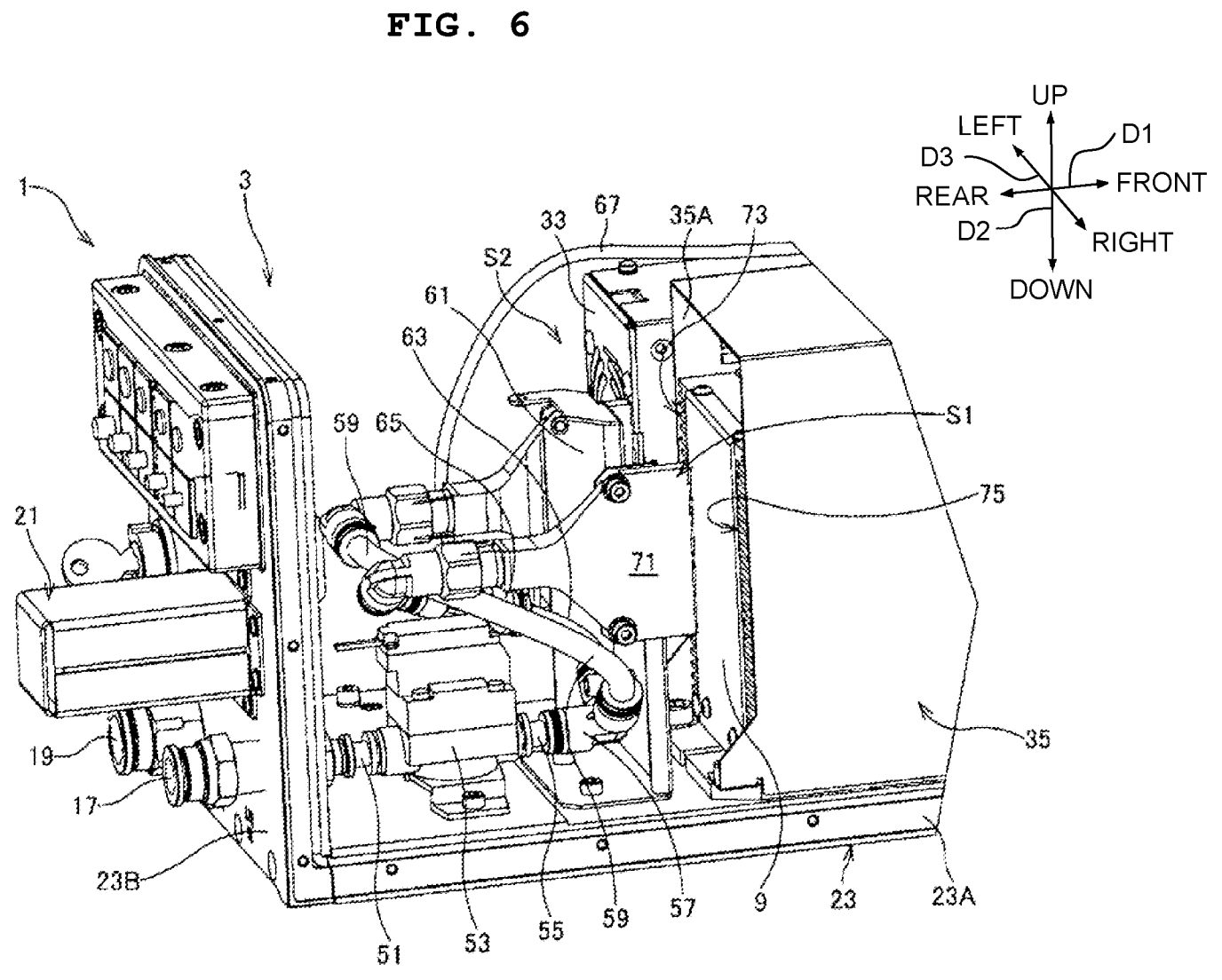
Figure 7:
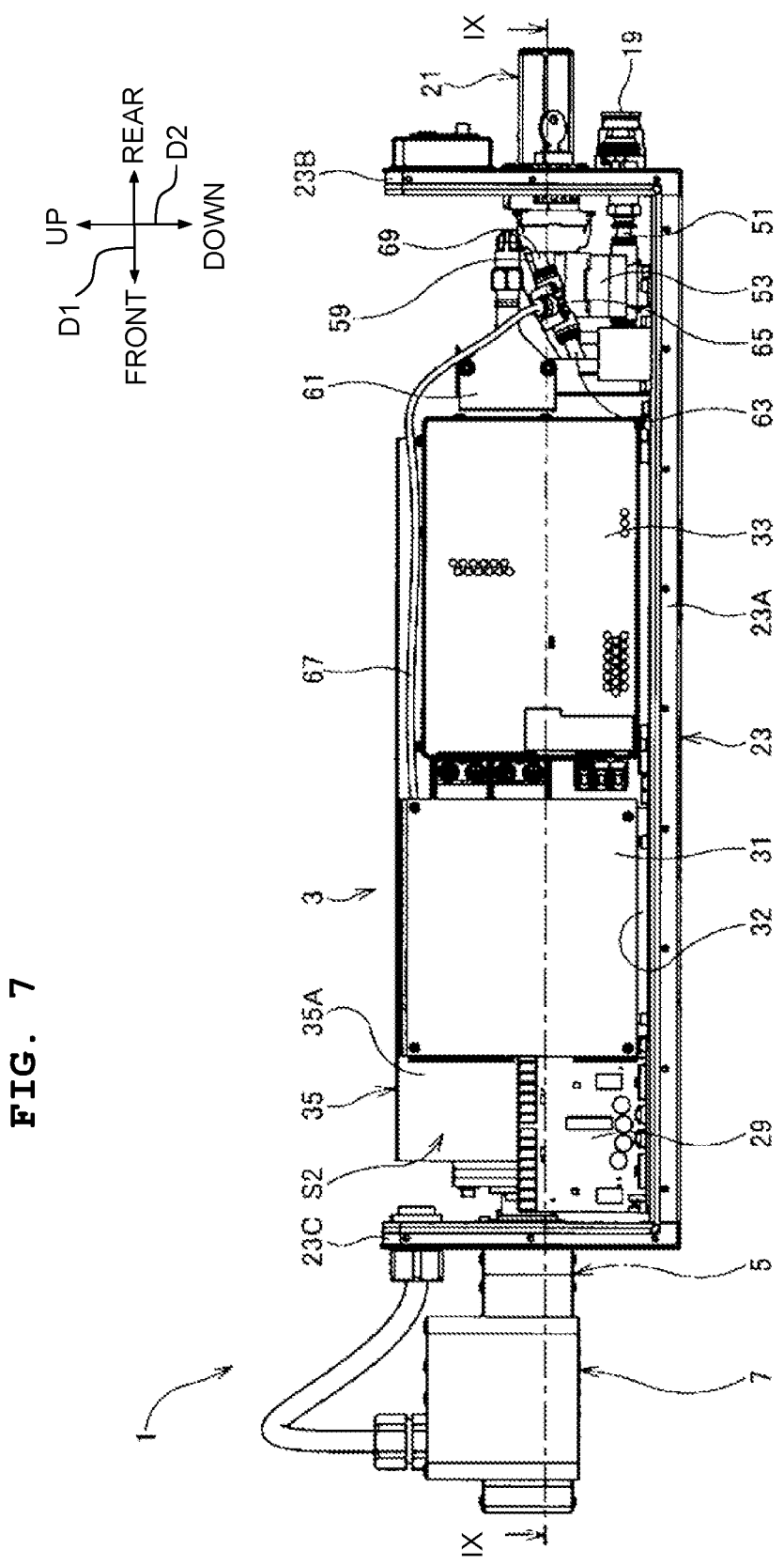
FIG. 7 is a front view showing the same laser marker without the outer cover.

A specific explanation will be made for such system of the pipe 37. As shown in FIGS. 5 to 7, to the air intake port 17, a conduit tube 51, an electromagnetic valve 53, a conduit tube 55, and a first branch joint 57 are connected in the same order as written herein. The electromagnetic valve 53 is a so-called on/off valve. The first branch joint 57 is a pipe joint of one-touch type branched in three directions. The pipe part from the air intake port 17 to the first branch joint 57 (the respective conduit tubes 51 and 55) correspond to the main pipe 39. That is, the electromagnetic valve 53 is provided midway in the main pipe 39, and the first branch joint 57 is provided at the first branch point 47. The compressed air in the main pipe 39 is controlled by the electromagnetic valve 53 for flowing and stop of the flowing.

A conduit tube 59 and a left nozzle 61 are connected to the first branch joint 57 in the same order as written herein. The conduit tube 59 corresponds to the first branch pipe 41. That is, the leading end 41A of the first branch pipe 41 is provided with the left nozzle 61.

Further, a conduit tube 63, a second branch joint 65, and a conduit tube 67 are connected to the first branch joint 57 in the same order as written herein. The second branch joint 65 is a pipe joint of one-touch type branched in three directions. Each of the conduit tubes 63 and 67 corresponds to the second branch pipe 43. That is, the second branch point 49 is provided with the second branch joint 65.

A conduit tube 69 and a right nozzle 71 are connected to the second branch joint 65 in the same order as written herein. The conduit tube 69 corresponds to the third branch pipe 45. That is, the leading end 45A of the third branch pipe 45 is provided with the right nozzle 71.

Henceforth, the respective conduit tubes 51, 55, 59, 63, 67, and 69 correspond to the pipe 37.

The left nozzle 61 and the right nozzle 71 are positioned at the rear side of the laser emission unit 9 in the first space S1, being directed to the laser emission unit 9. The laser emission unit 9 is shaped into an approximate cuboid elongate in the front/rear direction D1. Among the six surfaces of the laser emission unit 9, the left surface and the right surface are provided with a left heat sink 73 and a right heat sink 75, respectively. The heat sinks 73 and 75 each have a plurality of plate-like fins arranged along the front/ rear direction D1. Each of the heat sinks 73 and 75 is arranged between the inner cover 35 and the laser emission unit 9. The left nozzle 61 is directed to the left heat sink 73 while the right nozzle 71 is directed to the right heat sink 75.

Figure 8:
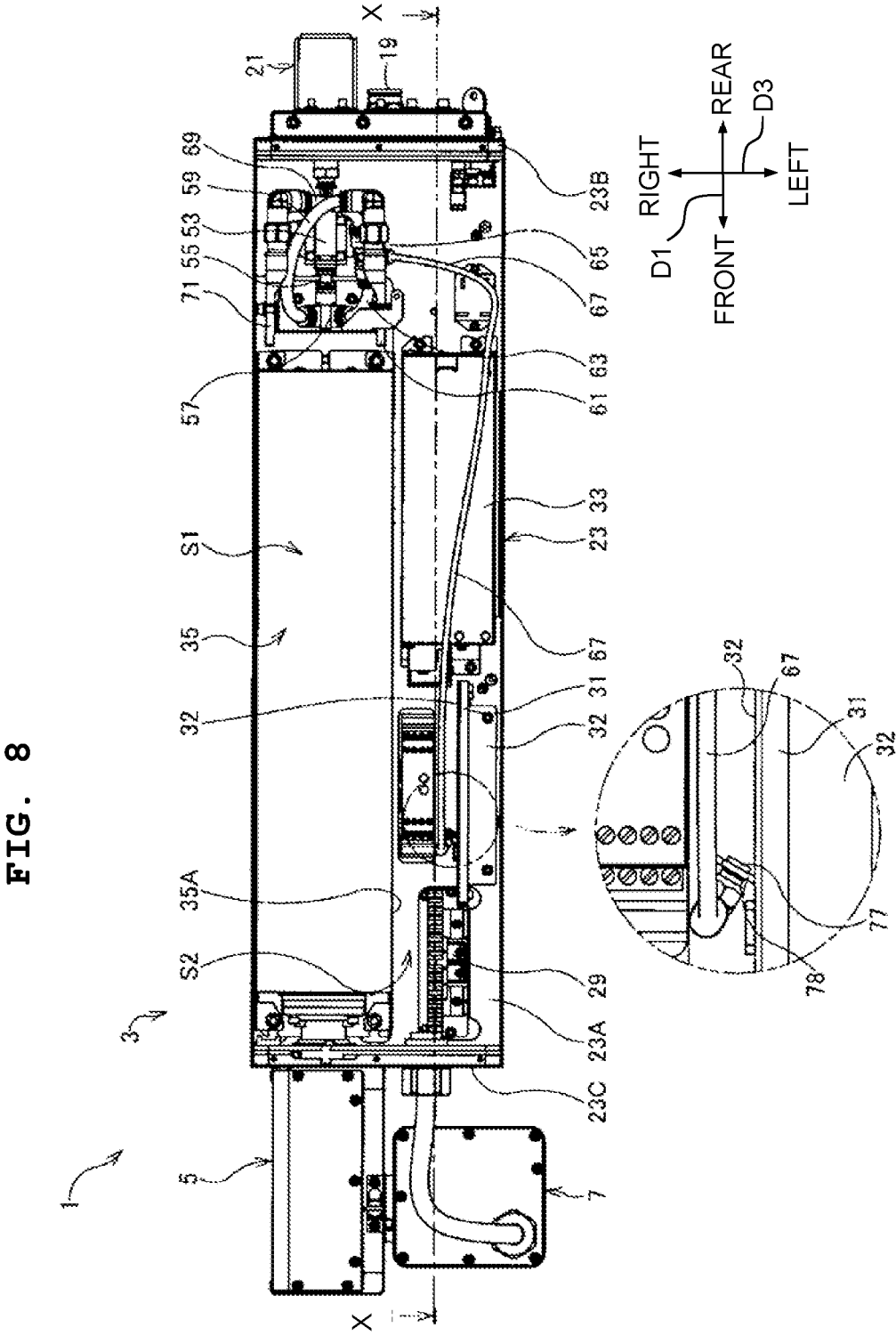
FIG. 8 is a plan view showing the same laser marker without the outer cover.
Figure 9:
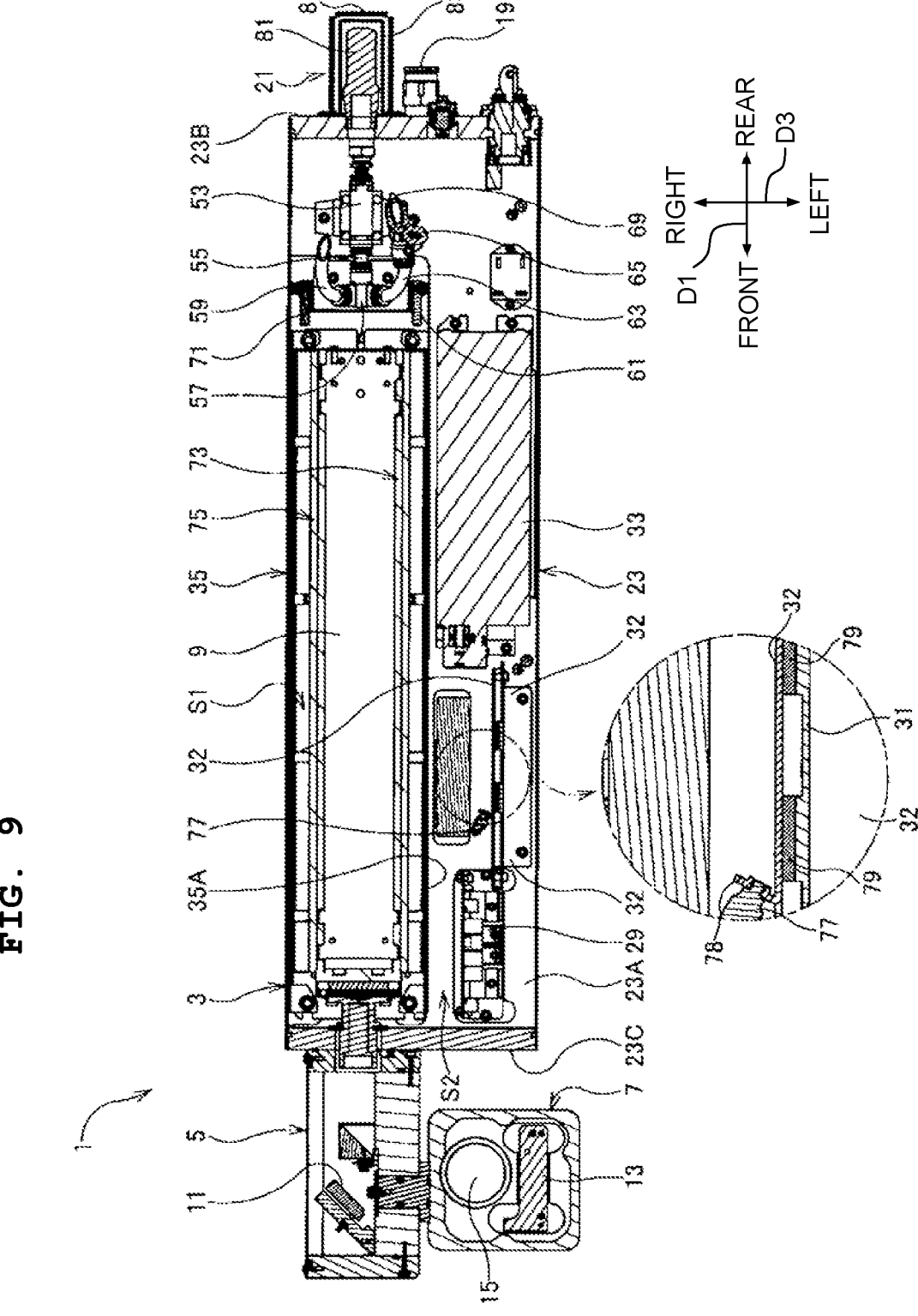
FIG. 9 is a view showing the cross section cut up along the line IX-IX of FIG. 7 of the same laser marker without the outer cover.
Figure 10:
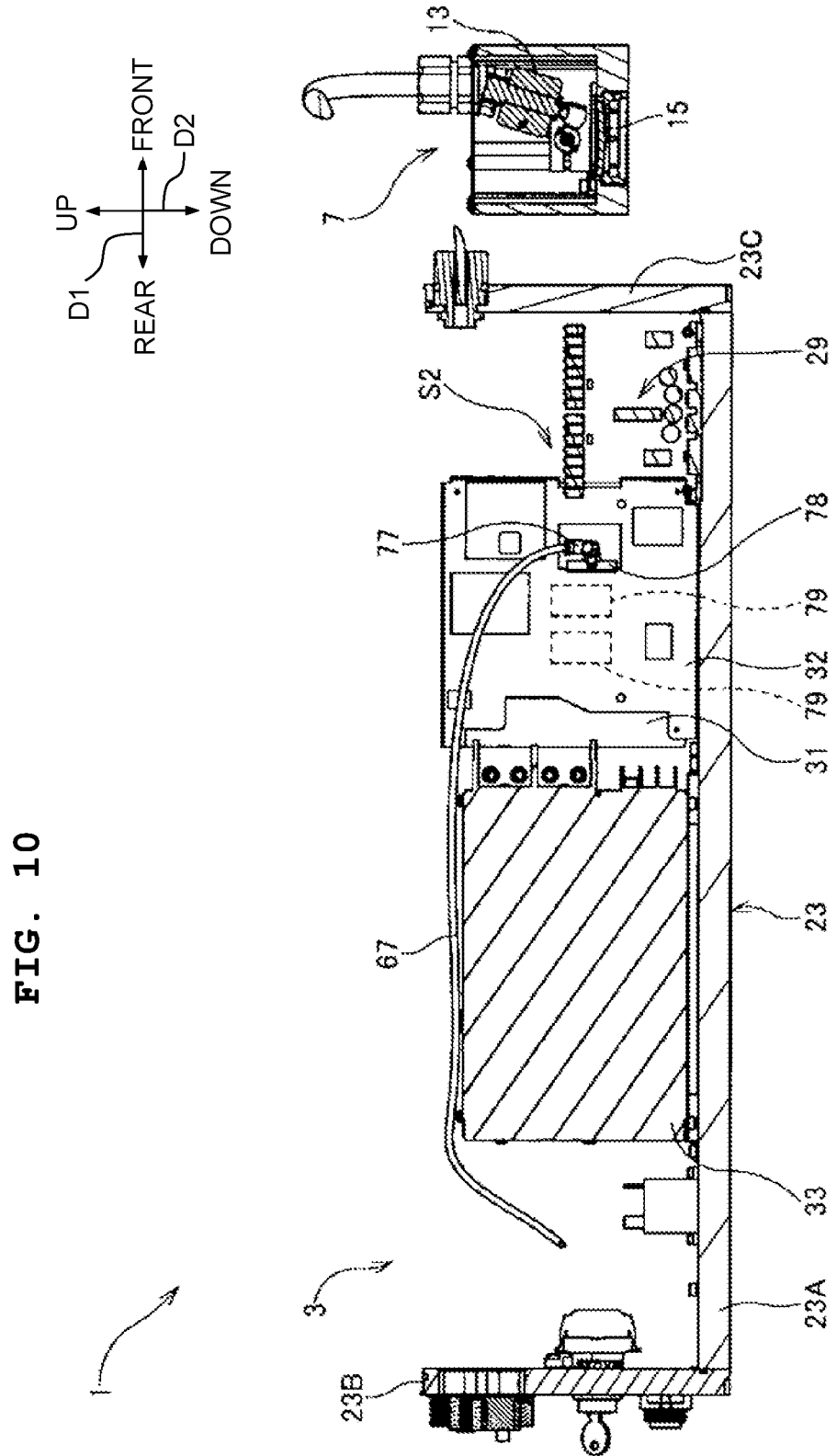
FIG. 10 is a view showing the cross section cut up along the line X-X of FIG. 8 of the same laser marker without the outer cover.

The conduit tube 67 is arranged to pass above the power unit 33 in the second space S2 at the left side of the left surface 35A of the inner cover 35. Further, as shown in FIGS. 8 to 10, the conduit tube 67 passes through as far as between the left surface 35A of the inner cover 35 and the bracket 32. The pipe joint 77 of one-touch type is connected to the leading end of the conduit tube 67. That is, the pipe joint 77 is connected to the leading end 43A of the second branch pipe 43.

The pipe joint 77 is fixed on a projecting piece 78 projecting from the bracket 32 to the right side due to the bracket 32 being partially cut in up, in a state of being directed a little more to the left side than at the rear side (that is, to the side of the bracket 32). Between the bracket 32 and the main substrate 31, two thermal conducting sheets 79, 79 are interposed. The thermal conducting sheets 79, 79 are each in tight contact with the bracket 32 and in tight contact with heat emitting elements comparatively weak in heat-resisting property among the electric parts mounted on the main substrate 31. By virtue of this, the main substrate 31 transmits its heat to the metallic bracket 32 via the respective thermal conducting sheets 79, 79. The pipe joint 77 is fixed on the projecting piece 78 of the bracket 32, as described above, and is directed to the respective thermal conducting sheets 79, 79 via the bracket 32, from the right side of the bracket 32 by way of being directed a little more to the left side than to the rear side (that is, to the side of the bracket 32).

Inside the first body 3, the compressed air taken in from the air intake port 17 is jetted out from the left nozzle 61, the right nozzle 71, and the pipe joint 77. The compressed air having jetted from the left nozzle 61 and the pipe joint 77 flows frontward in the first space S1 between the inner cover 35 and the laser emission unit 9 to hit the front plate 23C and then flow rearward in the second space S2 after taking away the heat of the laser emission unit 9 from the respective heat sinks 73 and 75.

The compressed air having jetted from the pipe joint 77 hits the bracket 32 in the second space S2 so as to flow rearward in the second space S2 after taking away the heat of the main substrate 31.

In this manner, the air having taken away the heat from the laser emission unit 9 or the main substrate 31 flows rearward in the second space S2, and is then discharged out of the first body 3 from the exhaust port 19 or the silencer 21 provided on the back plate 23B.

Figure 11:
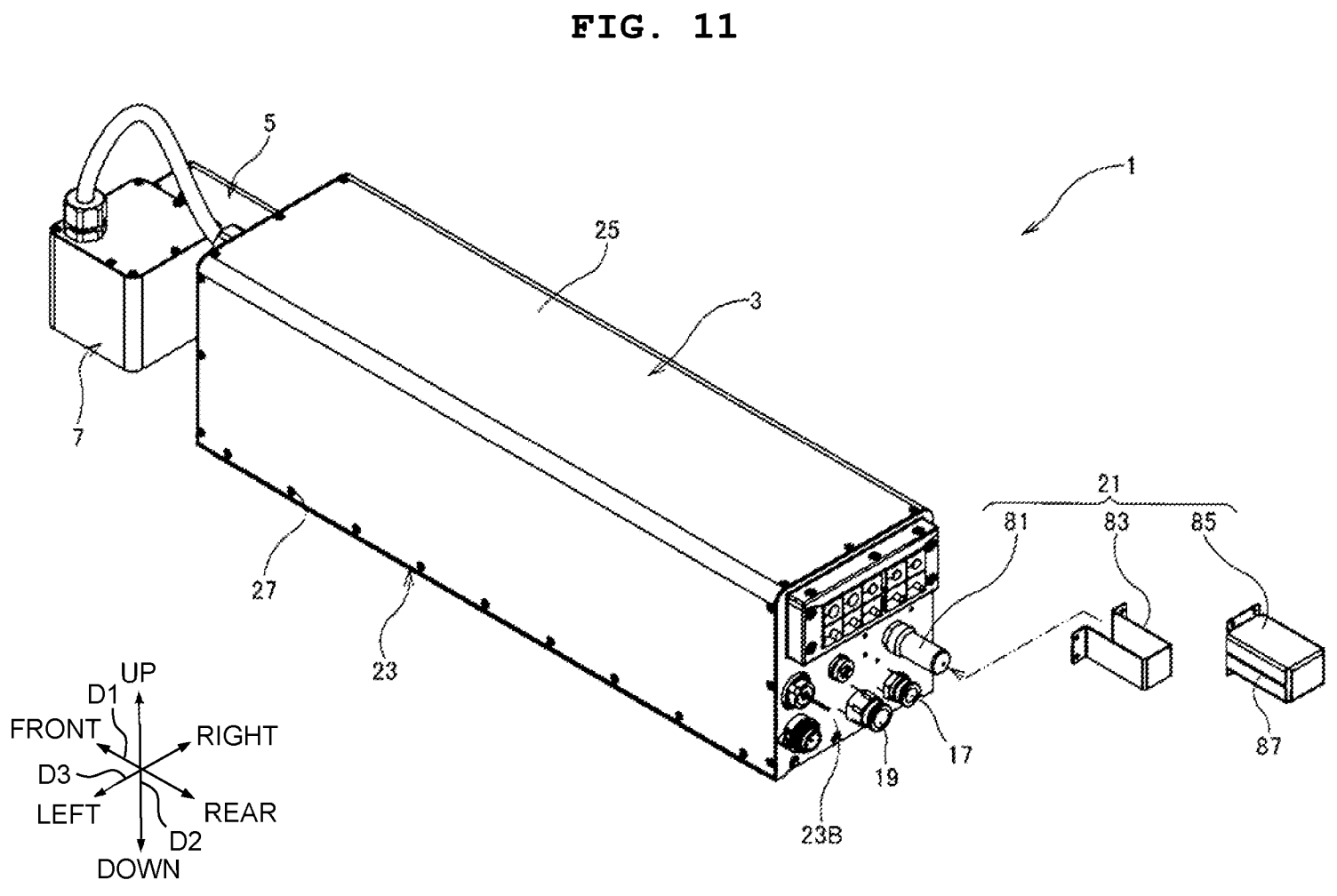
Figure 12:
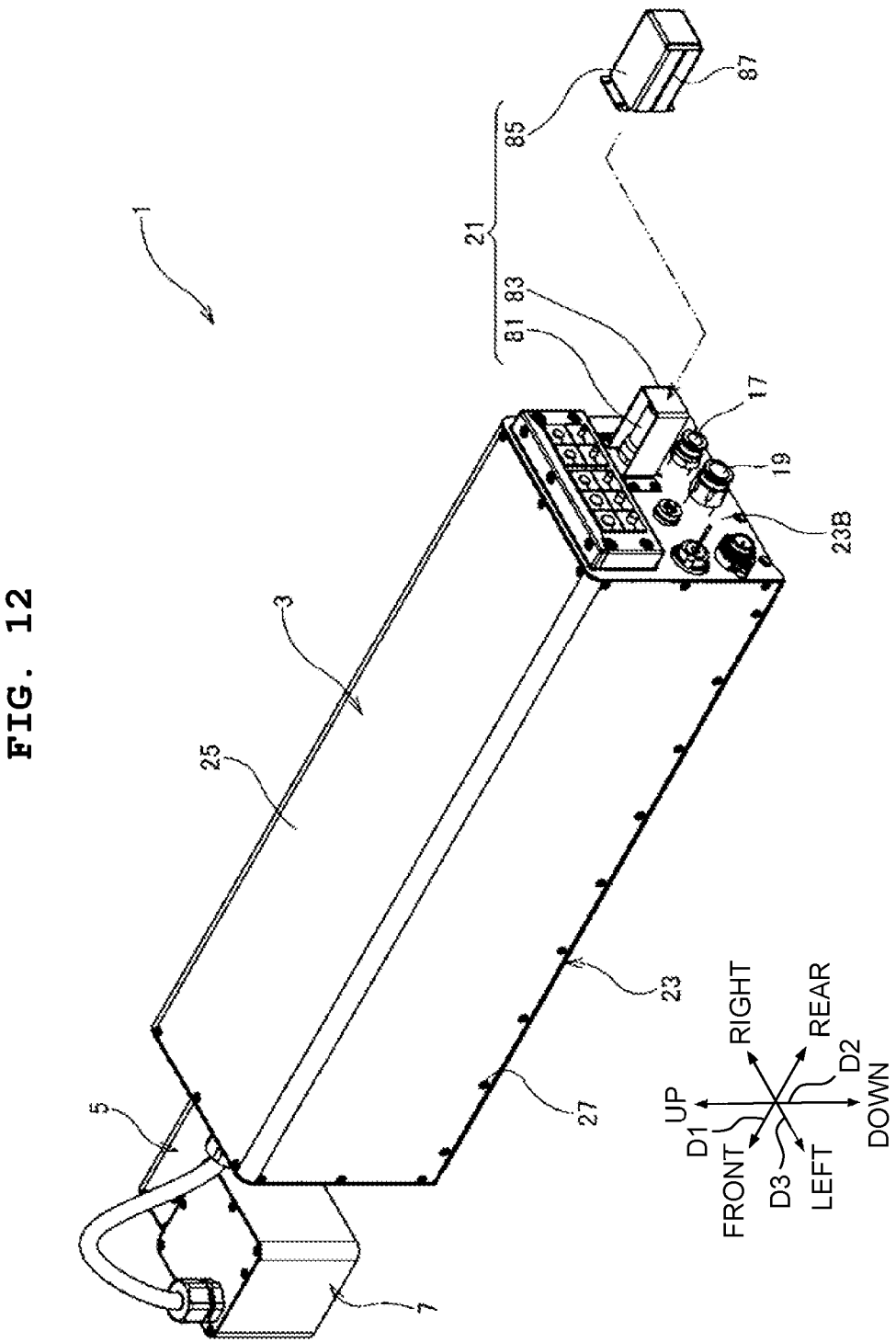
FIG. 12 is another perspective view showing the same laser marker with the silencer being disassembled.

As shown in FIGS. 9, 11 and 12, the silencer 21 includes a silencer body 81, a first cover member 83, and a second cover member 85. The first cover member 83 is bent into a C-shape in a planar view, and its front side, upper side, and lower side are open. The first cover member 83 is fixed on the back plate 23B to enclose the silencer body 81 which passes through from the front side of the first cover member 83. The second cover member 85 is shaped into an approximate cuboid, each of right surface and left surface thereof is formed with a slit 87, and its front side is open. The silencer body 81 and the first cover member 83 are set into the second cover member 85 from the front side, and the second cover member 85 is fixed on the back plate 23B to enclose the silencer body 81 and the first cover member 83.

By virtue of this, the silencer 21 prevents liquids such as water and the like from flowing into the first body 3 from the silencer body 81. The air discharged from the silencer body 81 passes above or below the first cover member 83 and through the slit 87 of the second cover member 85 to be discharged out of the first body 3.

As explained above in detail, in the laser marker 1 of this embodiment, the left nozzle 61 of the conduit tube 59 for jetting the compressed air (the leading end 41A of the first branch pipe 41) is arranged to face the laser emission unit 9 while the pipe joint 77 of the conduit tube 67 for jetting the compressed air (the leading end 43A of the second branch pipe 43) is arranged to face the bracket 32 fixing the main substrate 31. Therefore, in the laser marker 1 of this embodiment, with the wind of the compressed air directly hitting the laser emission unit 9 and the bracket 32 (the main substrate 31), exhausting heat is performed by way of forced convection such that improvement of the cooling efficiency is facilitated for the laser emission unit 9 and the bracket 32 (the main substrate 31). Note that much the same is true on the right nozzle 71 of the conduit tube 69 for jetting the compressed air (the leading end 45A of the third branch pipe 45). Further, in the laser marker 1 of this embodiment, because the bracket 32 (the main substrate 31) is cooled with the wind of the compressed air directly hit thereupon, it is possible to sufficiently cool the laser emission unit 9 without being affected by the heat emitted at the main substrate 31.

Further, in the laser marker 1 of this embodiment, due to the left surface 35A of the inner cover 35 interposed between the laser emission unit 9 and the bracket 32 (the main substrate 31), thermal barrier is applied between the laser emission unit 9 and the bracket 32 (the main substrate 31). Therefore, improvement of the cooling efficiency is further facilitated for the laser emission unit 9 and the bracket 32 (the main substrate 31).

Further, in the laser marker 1 of this embodiment, the first space S1 where the laser emission unit 9 is arranged is in communication with the second space S2 where the bracket 32 (the main substrate 31) is arranged, on both sides in the front/rear direction D1 along which the left surface 35A of the inner cover 35 extends. Further, in the first space S1, at the rear side of the laser emission unit 9 in the front/rear direction D1, the left nozzle 61 of the conduit tube 59 (the leading end 41A of the first branch pipe 41) is arranged. Further, the exhaust port 19 and the silencer 21 are provided on the back plate 23B of the first body 3 positioned at the rear side in the front/rear direction D1.

Therefore, the compressed air having jetted from the left nozzle 61 of the conduit tube 59 (the leading end 41A of the first branch pipe 41) flows frontward from the rear part in the first space S1 in the front/rear direction D1 and, further, flows rearward from the front part in the second space S2 in the front/rear direction D1 to be discharged out of the first body 3 from the exhaust port 19 or the silencer 21. In this manner, in the laser marker 1 of this embodiment, the air flowing circularly inside the first body 3 is discharged out of the first body 3 such that exhausting heat is performed efficiently by the forced convection. Note that much the same is true on the right nozzle 71 of the conduit tube 69 (the leading end 45A of the third branch pipe 45) for jetting the compressed air.

Further, in the laser marker 1 of this embodiment, in the second space S2, the pipe joint 77 of the conduit tube 67 (the leading end 43A of the second branch pipe 43) is directed a little more to the left side than to the rear side (that is, to the side of the bracket 32) in the front/rear direction. Therefore, in the second space S2, because the compressed air having jetted from the pipe joint 77 of the conduit tube 67 (the leading end 43A of the second branch pipe 43) flows rearward from the front side in the front/rear direction D1, the compressed air having jetted from the left nozzle 61 of the conduit tube 59 (the leading end 41A of the first branch pipe 41) flows in the same direction. By virtue of this, with the laser marker 1 of this embodiment, it is possible to stabilize the air flow inside the first body 3. Nate that much the same is true on the right nozzle 71 of the conduit tube 69 (the leading end 45A of the third branch pipe 45) for jetting the compressed air.

Further, in the laser marker 1 of this embodiment, the left nozzle 61 of the conduit tube 59 (the leading end 41A of the first branch pipe 41) is directed to the left heat sink 73 of the laser emission unit 9 whereas the right nozzle 71 of the conduit tube 69 (the leading end 45A of the third branch pipe 45) is directed to the right heat sink 75 of the laser emission unit 9. Therefore, in the laser marker 1 of this embodiment, the compressed air having jetted from the left nozzle 61 of the conduit tube 59 (the leading end 41A of the first branch pipe 41) flows toward the left heat sink 73 of the laser emission unit 9 whereas the compressed air having jetted from the right nozzle 71 of the conduit tube 69 (the leading end 45A of the third branch pipe 45) flows toward the right heat sink 75 of the laser emission unit 9, such that heat dissipation is performed efficiently for the laser emission unit 9.

Further, in the laser marker 1 of this embodiment, the thermal conducting sheets 79, 79 are each interposed between the main substrate 31 and the bracket 32. Further, the pipe joint 77 of the conduit tube 67 (the leading end 43A of the second branch pipe 43) is directed to the respective thermal conducting sheets 79, 79 via the bracket 32, from the right side of the bracket 32. Therefore, if the compressed air has jetted from the pipe joint 77 of the conduit tube 67 (the leading end 43A of the second branch pipe 43), then the compressed air hits the bracket 32 such that it is possible for the compressed air to take away the heat transmitted from the main substrate 31 to the bracket 32 via the respective thermal conducting sheets 79, 79. Further, even if the compressed air has not jetted from the pipe joint 77 of the conduit tube 67 (the leading end 43A of the second branch pipe 43), because the heat is transmitted from the main substrate 31 to the bracket 32 via the respective thermal conducting sheets 79, 79, heat dissipation of the main substrate 31 is still maintained.

Further, in the laser marker 1 of this embodiment, the conduit tube 69 (the third branch pipe 45) has a larger internal diameter (for example, 5 mm) than the conduit tube 67 (for example, 2.5 mm; that is, the part of the second branch pipe 43 from the leading end 43A of the second branch pipe 43 to the second branch point 49). In other words, the conduit tube 67 has a smaller internal diameter (for example, 2.5 mm; that is, one part of the second branch pipe 43 including the leading end 43A of the second branch pipe 43) than the conduit tube 59 (the first branch pipe 41; for example, 5 mm).

In this manner, in the laser marker 1 of this embodiment, by applying a difference in internal diameter to the respective conduit tubes 59, 67 and 69, the amount of the compressed air, which is jetted from each of the left nozzle 61 of the conduit tube 59 (the leading end 41A of the first branch pipe 41), the pipe joint 77 of the conduit tube 67 (the leading end 43A of the second branch pipe 43), and the right nozzle 71 of the conduit tube 69 (the leading end 45A of the third branch pipe 45), is adjusted according to the heat emitting amount of the laser emission unit 9 and the heat emitting amount of the main substrate 31.

In this embodiment, meanwhile, the laser marker 1 is an example of the "laser processing apparatus". The left surface and the right surface of the laser emission unit 9 are examples of the "at least two lateral surfaces of the plurality of lateral surfaces constructing the laser emission unit". The exhaust port 19 and the silencer 21 are examples of the "vent". The first body 3 is an example of the "casing". The back plate 23B is an example of the "lateral surface positioned at the other side in the partitioning direction among the plurality of lateral surfaces constructing the casing". The main substrate 31 and the bracket 32 are examples of the "control member". The bracket 32 is an example of the "fixing member". The left surface 35A of the inner cover 35 is an example of the "wall". The second branch point 49 is an example of the "branched position of the third branch pipe". The left heat sink 73 and the right heat sink 75 are examples of the "plurality of heat sinks". The left heat sink 73 is an example of the "one heat sink". The right heat sink 75 is an example of the "other heat sink". Each of the thermal conducting sheets 79, 79 is an example of the "thermal conductive member". The front/rear direction D1 is an example of the "partitioning direction".

Note that the present disclosure is not limited to this embodiment but can be changed in various manners without departing from the true spirit thereof. For example, even if either the left nozzle 61 of the conduit tube 59 (the leading end 41A of the first branch pipe 41) or the right nozzle 71 of the conduit tube 69 (the leading end 45A of the third branch pipe 45) is omitted, improvement of the cooling efficiency is still facilitated for the laser emission unit 9 and the bracket 32 (the main substrate 31).

Further, the respective heat sinks 73 and 75 of the laser emission unit 9 may each have a fin in a shape of needle-point holder or a bellows-like fin, for example, instead of the plurality of plate-like fins. Further, in the laser emission unit 9, instead of the left heat sink 73 or the right heat sink 75, an upper heat sink may be provided on the upper surface of the laser emission unit 9. In such a case, the left nozzle 61 of the conduit tube 59 (the leading end 41A of the first branch pipe 41) or the right nozzle 71 of the conduit tube 69 (the leading end 45A of the third branch pipe 45) is directed to the upper sink.

Further, if the exhaust port 19 and the silencer 21 are arranged on the back plate 23B at the side of the second space S2, that is, on the left part of the back plate 23B, then the first space S1 and the second space S2 may be in communication only on the front side in the front/rear direction D1 in which the left surface 35A of the inner cover 35 extends.

Further, instead of the compressed air, a compressed gas such as nitrogen, helium or the like, for example, may be taken into the air intake port 17.

What is claimed is:

1. A laser processing apparatus comprising:
   a laser emission unit configured to emit laser beam;
   a control member configured to control the laser emission unit;
   a casing in which the laser emission unit and the control member are accommodated; and
   a pipe through which compressed gas supplied from outside of the casing flows in a branched manner, the pipe being provided in the casing,
   wherein the pipe includes a first branch pipe arranged with a nozzle facing the laser emission unit for jetting the compressed gas facing the laser emission unit, and a second branch pipe arranged with a leading end for jetting the compressed gas facing the control member.

2. The laser processing apparatus according to claim 1, further comprising a wall provided between the laser emission unit and the control member.

3. The laser processing apparatus according to claim 2, further comprising:

a first space which is a space formed by partitioning inside the casing by the wall and in which the laser emission unit is arranged; and a second space which is a space formed by partitioning inside the casing by the wall, in which the control member is arranged, and which is in communication with the first space at least on one side in a partitioning direction along which the wall extends, wherein the nozzle of the first branch pipe is arranged on the other side in the partitioning direction with respect to the laser emission unit in the first space, and a vent for discharging the compressed gas inside the casing to the outside of the casing is provided in a lateral surface, which is included in a plurality of lateral surfaces constructing the casing and which is positioned on the other side in the partitioning direction.

4. The laser processing apparatus according to claim 3, wherein in the second space, the leading end of the second branch pipe is directed to the other side in the partitioning direction.

5. The laser processing apparatus according to claim 1, further comprising a third branch pipe arranged with a leading end for jetting the compressed gas facing the laser emission unit, wherein the laser emission unit comprises a plurality of heat sinks provided respectively on at least two lateral surfaces, which are included in a plurality of lateral surfaces constructing the laser emission unit, the nozzle of the first branch pipe is directed to one heat sink among the plurality of heat sinks, and the leading end of the third branch pipe is directed to another heat sink among the plurality of heat sinks.

6. The laser processing apparatus according to claim 1, wherein the control member comprises:

a control substrate;

a metallic fixing member which is fixed on the casing in a state that the control substrate is attached to the metallic fixing member; and a thermal conducting member which is interposed between the control substrate and the metallic fixing member, and the leading end of the second branch pipe is directed to the thermal conducting member from a side of the metallic fixing member.

7. The laser processing apparatus according to claim 5, wherein the third branch pipe branches from the second branch pipe.

8. The laser processing apparatus according to claim 7, wherein the third branch pipe has an internal diameter larger than an internal diameter of a part, of the second branch pipe, which is defined from the leading end of the second branch pipe to a branching position of the third branch pipe.

9. The laser processing apparatus according to claim 7, wherein the first branch pipe has an internal diameter larger than an internal diameter of a part, of the second branch pipe, which is defined from the leading end of the second branch pipe to a branching position of the third branch pipe.

10. The laser processing apparatus according to claim 1, wherein a part of the second branch pipe including the leading end of the second branch pipe has an internal diameter smaller than an internal diameter of the first branch pipe.

\* \* \* \* \*